United States Patent
Miguel et al.

[11] 3,813,941
[45] June 4, 1974

[54] MARINE LEVELMETER

[76] Inventors: Francisco Angel de Iturribarria Miguel; Angel de Urruticoechea Zalbide, both of Uri Ctarte No. 8-6°, Bilbao, Spain

[22] Filed: Sept. 23, 1971

[21] Appl. No.: 183,009

[30] Foreign Application Priority Data
June 16, 1971 Spain .................................. 392311

[52] U.S. Cl.................................... 73/313, 73/322
[51] Int. Cl.............................................. G01f 23/10
[58] Field of Search .......... 73/313, 322.5, 300, 322, 73/290 A, 300, 170 A; 137/582

[56] References Cited
UNITED STATES PATENTS

| | | | |
|---|---|---|---|
| 1,293,991 | 2/1919 | Vandermyde | 73/313 X |
| 2,592,159 | 4/1952 | Klebba et al. | 73/300 |
| 2,678,060 | 5/1954 | Ame | 73/322.5 X |
| 3,113,282 | 12/1963 | Coleman | 73/322.5 X |
| 3,301,047 | 1/1967 | Von Wald, Jr. et al. | 73/170 A |

OTHER PUBLICATIONS
Publ. "History & Development of Wave Action" by J. H. Upham El. Wave Staff (Hydro Model MK 1) US Hydro Off. Tech. Rep. No. 9, Mar. 13, 1955.

*Primary Examiner*—Richard C. Queisser
*Assistant Examiner*—Daniel M. Yasich
*Attorney, Agent, or Firm*—Charles W. Helzer

[57] ABSTRACT

A marine levelmeter essentially constituted by an exterior tubular body whose lower end is closed by a cover in which there are made three orifices and within which there is concentrically situated an interior tubular body with the lower end closed by a cover in which there exists one single orifice, the said two bodies being maintained by means of complementary tie rods in such a position that between one and another there exists a permanent separation on all sides. Within the interior tubular body there is situated a float from which there rises a rod at the upper end of which, and electrically insulated from it, a metal crosspiece is fixed which has attached to its ends two sensing elements, sliding respectively over the smooth terminal of a pole and over a resistance in which there terminates the other pole of the electric conduction which, through a shunt or shunting resistor, terminates in a measuring apparatus situated on the deck of the vessel.

6 Claims, 2 Drawing Figures

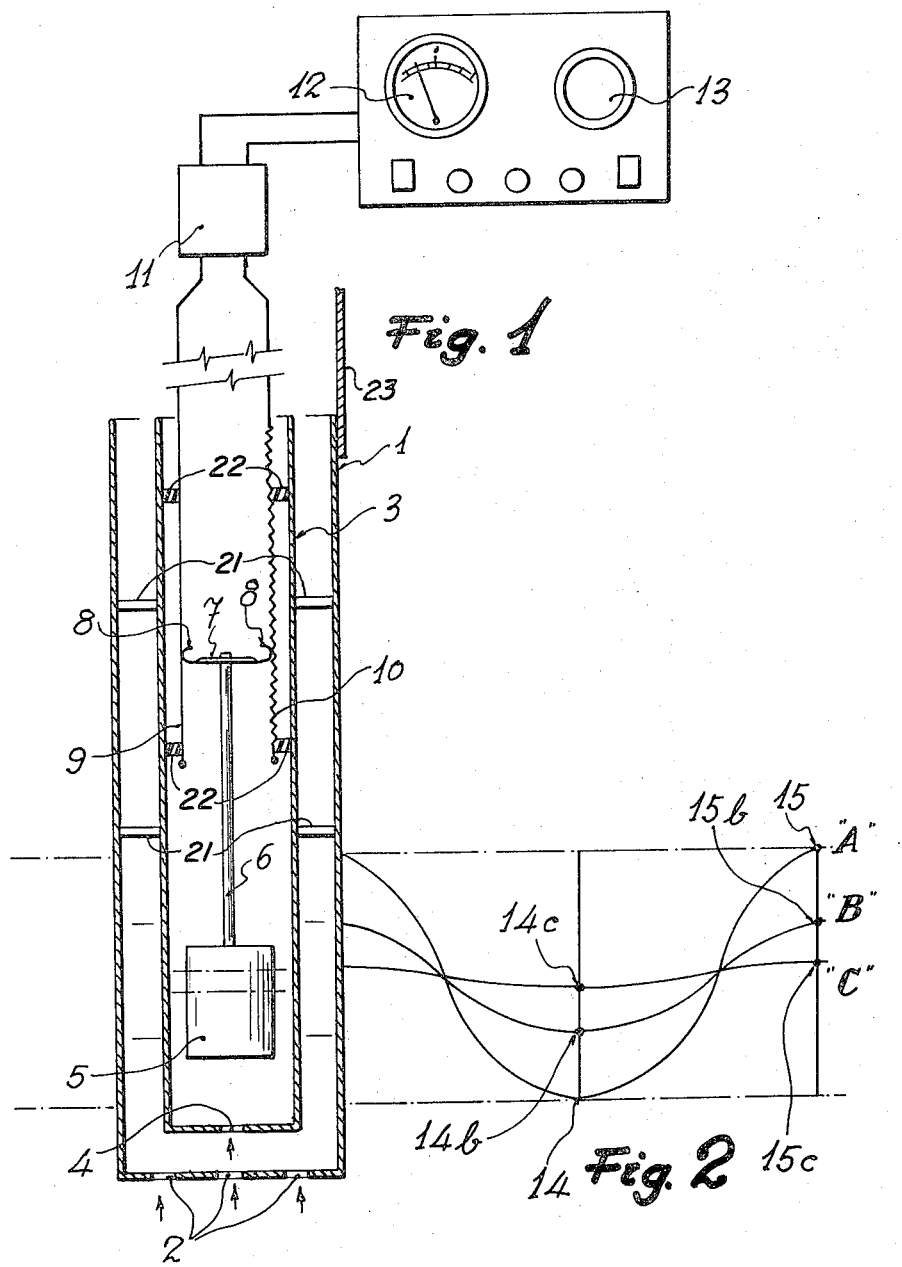

MARINE LEVELMETER

During the operations of loading or ballasting a vessel, the verifications of measurements that make it possible to determine the tonnage loaded are carried out on the exterior draft gauge which the vessel has on it in relation to its load water line.

This makes it necessary for the person or persons charged with carrying out the said measurements to continuously inspect the draft of the vessel, or to descend from the vessel into an auxiliary boat a number of times in order to place themselves as near as possible to the level of the water.

This work is exceedingly troublesome, at times dangerous and, above all quite inaccurate on many occasions due to the difficulties of appreciating a given level when the water is somewhat agitated.

The levelmeter, in accordance with the present invention, is an apparatus which avoids all the disadvantages mentioned, since it is equipped with means that enable it to carry out the measurements from the deck of the vessel itself, and with a degree of precision not yet attained by even the most highly specialized personnel. This precision is achieved because of the fact that the measurements in question are carried out in the interior of a wave action damping device which reduces to a minimum percentage the variations of level existing between the crest and the trough of the cycle of a wave.

The operations of loading vessels are carried out normally inside port areas or in duly sheltered places in which the said variations of level between trough and crest do not normally exceed 500 millimeters. A greater difference would make it impossible to carry out the measurements which, under existing circumstances, are made by estimating the middle line between the maximum level of the crest and the minimum level of the trough. The wave action damping device incorporated in the levelmeter in accordance with the invention makes it possible for the measurements to be carried out in a place in which the variations of levels are of the order of 5 to 10 per cent of the real measurements. This means that, in the worst of cases, the said damped variations will be only between 25 to 50 millimeters (with waves of half a meter), which are dimensions that are easy to measure because of their small extension. Dimensions in this range of values may be measured electrically on a graduated apparatus situated in an appropriate place on the deck of the vessel, and with which, on a much more reduced and exact scale, it is much easier to determine the average of the waves and to refer this to the known values of the exterior scale which appears on the hull of the vessel.

In order that the purpose of the invention may be better understood, and merely by way of example, a sheet of drawings is attached hereto. In the said drawings:

FIG. 1 in conjunction with FIG. 2 represents a complete marine levelmeter constructed in accordance with the invention.

FIG. 2, which is related to FIG. 1, is a functional diagram of a wave action damping device comprising a part of the marine levelmeter and includes a graphic representation of the water waves exterior to the device, in which the measurements are carried out, and depict the action of the wave action damping device in damping out the wave action.

In the said drawings, and in the following description, the constituent elements and principal parts of the levelmeter have been designated in accordance with the following nomenclature:
1. Exterior tubular body.
2. Orifices.
3. Interior tubular body.
4. Orifice.
5. Float.
6. Rod or spindle.
7. Metal crosspiece.
8. Sensing elements.
9. Smooth terminal member.
10. Resistance wire.
11. Shunt.
12. Milliammeter.
13. Potentiometer.
14. Minimum level.
15. Maximum level.

"A" — Curve of a wave cycle in open water.
"B" — Curve of the first damping.
"C" — Curve of the second damping, by the wave action damping device.

Referring to the abovementioned drawings, we see that the wave action damping device of the levelmeter is essentially comprised by an exterior tubular body (1) whose lower end is closed by a cover in which there are made, for example, three orifices (2). Within tubular body (1) there is concentrically situated an interior tubular body (3) having its lower end closed by a cover in which there exists one single orifice (4). The said two tubular bodies (1) and (3) are maintained by means of complementary tie rods 21 in a position similar to that indicated in the diagram, so that between one and another there exists a permanent separation on all sides.

Within the interior tubular body there is situated a reciprocally movable float (5) having an upwardly extending connecting rod (6). At the upper end of rod (6), and electrically insulated from it is a metal crosspiece (7). Crosspiece (7) has attached to its ends two sensing elements (8) which slide respectively over a smooth terminal member (9) and over a resistance wire (10) that depend downwardly into interior tubular body 3 so as to be engaged by crosspiece (7). Terminal member (9) and resistance wire (8) are fixed relative to the sides of tubular members (1) and (3) and with respect to reciprocally movable crosspiece (7), by means of insulating supports 22, and are connected to respective ends of a shunt (11) or shunting resistor. Shunt or shunting resistor 11 in turn is electrically excited from a measuring apparatus situated on the deck of the vessel and equipped for example with a milliammeter (12) and a potentiometer (13), complemented with the necessary switches, lights, pilot-light, etc.

The submersible portion of the wave action damping device is constituted by the exterior (1) and interior (2) tubular bodies, the float (5) and the elements attached to or functioning together with the latter. The wave action damping device is secured to and suspended from any side or bottom of the vessel by any suitable tackle or other means 23 with which it is possible to measure the initial position of float (5) and hence crosspiece (7) relative to a median water level line for calibration purposes, and to which there will have to be added the electrical measurements that will reflect the damped variations of the levels occupied by the crest and the trough of each wave cycle together with increases or decreases in displacement due to loading or unloading of the vessel, respectively.

The operation of the device is exceedingly simple: it suffices to duly submerge the levelmeter to a point at which the minimum level (14) or level of the trough of the open water covers the lower part of the said device.

In the drawing of FIG. 2, which is related to FIG. 1, it can be appreciated that the distance which exists between the said minimum level (14) and the maximum level (15) or level of the crest of the waves in the open water is reduced by approximately 50 per cent in the interior of the chamber defined by the space between the two tubular bodies (1) and (3). In this space the variations of level graphically expressed by the curve "A" for the said open waters undergoes a first damping which is expressed by the curve "B" because of the delay that the small cross section of the orifices (2) produces in the circulation of the water through them. Effectively, due to the cross section of the said orifices, and as a consequence of the frequency with which the wave cycles are repeated, substantial first damping of the wave motion takes place. In the waves of the open water there is produced a trough (14) before the water has been able to emerge through the orifices (2) after a crest (15) has already been produced, and vice versa. These exterior alternations of level are initiated, but are not completed (because of there not being sufficient time) in the interior space between tubular bodies (1) and (3), in which there are created some minimum (14b) and maximum (15b) levels which determine the abovementioned curve "B."

The second damping or reduction in the variation of maximum and minimum levels takes place in the interior of the interior tubular body (3), into which the water enters through an even narrower communication passage formed by the orifice (4) producing in it the same results as do the orifices (2) with respect to the exterior body (1). In this way, the variations that are produced between the minimum (14c) and maximum (15c), corresponding to the trough and to the crest of the wave within the interior tubular body (3), have a value of between 5 and 10 per cent of the variations of the open water. These variations are graphically expressed by the curve "C" and are those which are experienced by the float (5) which, appropriately guided, rises and falls within the said interior tubular body (3). Consequently the sensing elements (8) of the metal crosspiece (7) will contact different points along the length of resistance wire (10) and close the electric circuit on different values of the resistance giving maximum and minimum values which are adjusted by the potentiometer (13) and recorded on the graduated scale of milliameter 12. The average of the said value, which is easy to read, is compared with calibrated tables of correspondence duly calculated for the vessel in question and, by means of the addition of the initial distances measured directly from the tackle from which the level-meter is suspended, it is possible to know at any moment the situation of the load water line of the vessel with respect to the average level of the open water, and to obtain this knowledge with an exactitude not achieved up to the present by means of traditional methods.

It is evident that the electrical measuring equipment, instead of being constituted by the said milliammeter (12) and potentiometer (13) can be constituted by any circuit and measurement apparatus that makes it possible to note at a remote position on the deck of the vessel in visual or graphic form the variations in the electric current which are indicative of the different lengths of resistance wire (10) brought into service by the crosspiece (7) and its sensing elements (8) connected with the float (5). It will be appreciated therefore that the said resistance wire (10) behaves like a cursor rheostat, which cursor is nothing other than the said crosspiece (7).

The circumstances of size, form and material with which each one of the elements that constitute the levelmeter is fabricated, may be changed in accordance with design requirements, and in the overall levelmeter there may be varied everything that does not imply an alteration in the essence of the subject of the foregoing description which should be taken in its widest sense and not as a limitation of possibilities of implementation as set forth in the following claims.

What is claimed is:

1. A marine levelmeter comprising water level sensing means designed for suspension from a vessel having an actual load waterline level and a plurality of precalibrated waterline levels for sensing the actual load waterline level of the vessel, means for supporting said water level sensing means immersed in the water in which the vessel floats at a point in the draft of the vessel such that it is operative over a range of drafts of the vessel extending between an unloaded condition to a fully-loaded condition as determined by the precalibrated waterline levels, means responsive to said water level sensing means for providing a remote indication of the sensed actual location of the load waterline level relative to the precalibrated waterline levels, and wave action damping means coacting with said water level sensing means for reducing to a minimum the wave action of the water acting on the water level sensing means to thereby minimize the effect of variations of level existing between the crest and the tough of each cycle of a wave of open water on the sensed actual location of the load waterline level.

2. A marine levelmeter as defined in claim 1, further characterized in that the damping means comprises an exterior body whose lower end is closed by a cover in which there are formed a predetermined number of orifices which permit a narrowed passage for the circulation of the water into the interior of said exterior body, said exterior body having supported therewithin an interior body with the lower end closed by a cover in which there exists an even narrower communication passage for circulation of water to the interior of said interior body within which said level sensing means is supported.

3. A marine levelmeter as defined in claim 2, characterized in that within the interior body a float is movably situated, and electrical sensing and measuring apparatus having a movable sensing element secured to and movable with said float and electrically insulated from it.

4. A marine levelmeter as defined in claim 3, wherein the movable sensing element comprises a crosspiece fixed to a connecting rod secured to said float and reciprocally moved within the interior body, said crosspiece having two sliding contacts formed on the ends thereof for sliding respectively over the length of a smooth terminal member and over a resistance wire and forming a closed electrical path therethrough, said smooth terminal member and said resistance wire being connected across a source of electric current in circuit relationship with a measuring instrument comprising a part of the electrical sensing and measuring apparatus.

5. A marine levelmeter as defined in claim 4, wherein the source of electrical current includes a shunt or shunting resistor, connected across the smooth terminal member and the resistance wire and terminating in a measuring apparatus situated on the deck of the vessel and equipped with a milliammeter and a potentiometer, or other measuring equipment that makes it possible to note in visual or graphic form the variations in the electric current determined by the different lengths of resistance wire brought into service by the crosspiece and sliding contacts movable with the float, the whole complex having like a cursor rheostat which makes it possible to approximate the average between the maximum and minimum levels obtained by the said float within the damping means, said average being compared with tables of correspondence duly calculated for the vessel in question, and by means of the addition of the initial distances measured directly from the tackle from which the levelmeter is suspended, making it possible to determine at any moment the situation of the load water line of the vessel with respect to the average level of the open water.

6. A marine levelmeter as defined in claim 1, wherein said wave action damping means is a multi-stage damping means for successively reducing wave action in a multiplicity of successive stages to a minimum percentage of wave action before acting on the level sensing means.

* * * * *